(12) United States Patent
Agapov

(10) Patent No.: US 12,176,588 B2
(45) Date of Patent: Dec. 24, 2024

(54) REFLECTIVE LAMINATES

(71) Applicant: W.L. Gore & Associates, Inc., Newark, DE (US)

(72) Inventor: Alexander Agapov, Newark, DE (US)

(73) Assignee: W.L. Gore & Associates, Inc.

( * ) Notice: Subject to any disclaimer, the term of this patent is extended or adjusted under 35 U.S.C. 154(b) by 169 days.

(21) Appl. No.: 16/083,694

(22) PCT Filed: Mar. 9, 2017

(86) PCT No.: PCT/US2017/021607
§ 371 (c)(1),
(2) Date: Sep. 10, 2018

(87) PCT Pub. No.: WO2017/156293
PCT Pub. Date: Sep. 14, 2017

(65) Prior Publication Data
US 2019/0081341 A1  Mar. 14, 2019

Related U.S. Application Data

(60) Provisional application No. 62/307,261, filed on Mar. 11, 2016.

(51) Int. Cl.
*H01M 8/10* (2016.01)
*C10G 1/04* (2006.01)
(Continued)

(52) U.S. Cl.
CPC ......... *H01M 8/1023* (2013.01); *C10G 1/045* (2013.01); *H01M 8/1039* (2013.01);
(Continued)

(58) Field of Classification Search
CPC ............. H01M 8/1023; H01M 8/1039; H01M 8/1055; H01M 8/1053; H01M 8/106
See application file for complete search history.

(56) References Cited

U.S. PATENT DOCUMENTS 6,562,446 B1 * 5/2003 Totsuka ............... C25B 13/00
204/252
2008/0268314 A1  10/2008 Han et al.
(Continued)

FOREIGN PATENT DOCUMENTS

CA    2974600 A1   10/2015
EP    2226624 A1    9/2010
(Continued)

OTHER PUBLICATIONS

International Search Report and Written Opinion dated May 8, 2017, issued by the U.S. Patent and Trademark Office In International Application No. PCT/U2017/021607 (13 pages).

*Primary Examiner* — Ula C Ruddock
*Assistant Examiner* — Frank A Chernow
(74) *Attorney, Agent, or Firm* — Faegre Drinker Biddle & Reath

(57) ABSTRACT

A reflective laminate for use in fuel cell manufacture. The reflective laminate includes a polymer sheet and a reflective substrate having a reflectivity greater than 6% at each wavelength from 400 nm to 1000 nm removably adhered to the polymer sheet. The polymer sheet can include a polymer electrolyte membrane such as a perfluorosulfonic acid resin reinforced with expanded porous polytetrafluoroethylene. The reflective substrate can include a metal substrate (e.g., aluminum). The reflective substrate can reflect a portion of electromagnetic radiation traversing the polymer sheet. The portion of electromagnetic radiation reflected by the reflective substrate can be used to determine a characteristic or property of the polymer sheet (e.g., a size of the polymer sheet, a thickness of the polymer sheet, or a defect of the polymer sheet). A catalyst electrode can be applied to opposite sides of the polymer sheet to form a membrane electrode assembly ("MEA").

15 Claims, 7 Drawing Sheets

(51) Int. Cl.
   *H01M 8/1023* (2016.01)
   *H01M 8/1039* (2016.01)
   *H01M 8/1053* (2016.01)
   *H01M 8/106* (2016.01)
   *H01M 8/1067* (2016.01)

(52) U.S. Cl.
   CPC ......... *H01M 8/1053* (2013.01); *H01M 8/106* (2013.01); *H01M 8/1067* (2013.01); *H01M 2300/0082* (2013.01); *H01M 2300/0094* (2013.01)

(56) References Cited

U.S. PATENT DOCUMENTS

| | | |
|---|---|---|
| 2009/0226731 A1 | 9/2009 | Wittmann |
| 2010/0259748 A1 | 10/2010 | Suzuki |
| 2011/0027579 A1 | 2/2011 | Tate |
| 2012/0141914 A1* | 6/2012 | Namba ............... H01M 8/0245 429/492 |
| 2013/0226330 A1 | 8/2013 | Sopori et al. |
| 2017/0092974 A1 | 3/2017 | MacPhee |
| 2017/0141423 A1* | 5/2017 | Okada ................... B32B 43/006 |

FOREIGN PATENT DOCUMENTS

| | | |
|---|---|---|
| EP | 2472297 A1 | 7/2012 |
| JP | 2005-121438 A | 5/2005 |
| JP | 2005-294016 A | 10/2005 |
| JP | 2008-101926 A | 5/2008 |
| JP | 2012-164647 A | 8/2012 |
| JP | 2014-199348 A | 10/2014 |
| JP | 2014-239034 A | 12/2014 |
| JP | 2015-175815 A | 10/2015 |
| KR | 10-2008-0020259 A | 3/2008 |
| KR | 10-2016-0026107 A | 3/2016 |
| WO | 2008/030246 A2 | 3/2008 |
| WO | 2015/064312 A1 | 5/2015 |
| WO | 2017/156293 A1 | 9/2017 |

* cited by examiner

REFLECTIVE LAMINATES

RELATED APPLICATIONS

This application claims benefit of U.S. Provisional Application No. 62/307,261, filed Mar. 11, 2016, the entirety of which is being incorporated by reference herein.

FIELD OF THE INVENTION

The present disclosure relates generally to electrochemical devices in applications involving electrochemical reactions such as solid polymer type fuel cells, polymer electrolyte fuel cells ("PEFC"), electrolysis, gas sensors, or the like. More specifically, the disclosure relates to reflective laminates for fuel cells.

BACKGROUND OF THE INVENTION

Fuel cells incorporating polymer electrolyte membranes (PEM), also known as proton exchange membranes, have gained considerable acceptance for automotive, stationary and portable, power needs. Polymer electrolyte fuel cells (PEFC's) typically comprise a plurality of single cells laminated together. Each cell includes a membrane electrode assembly (MEA), comprising a PEM sandwiched between an anode catalyst layer and a cathode catalyst layer. Gas diffusion layers (GDL's) are provided at opposing surfaces of the anode and cathode catalyst layers in order to supply the fuel and oxygen, respectively, thereto. In a hydrogen fuel cell, a fuel source provides hydrogen to the anode catalyst layer, where hydrogen ions and electrons are formed. The electrons generate electricity in an external electric circuit. At the cathode catalyst layer, oxygen from the air combines with the hydrogen ions that pass through the membrane and the electrons from the external circuit, to form water.

A variety of different membranes are used in PEM fuel cells, depending on the fuel and expected operating conditions. Polyfluorinated sulfonic acid (PFSA) membranes are the most well known and most widely used PEM membrane, as exemplified by Nafion™ membrane by E.I. du Pont de Nemours and Company, USA. Non-fluorinated, so-called 'hydrocarbon' membranes are also used, as well as membranes that carry phosphoric acid as an electrolyte, such as polybenzimidizole (PBI). Single as well as multi-layer membranes are used. Electrodes (anode and cathode), most typically comprising platinum on a carbon support mixed with the same (or similar) ionomer used in the membrane, are coated onto either the membrane (forming a catalyst-coated membrane or CCM) or the GDL (forming a gas diffusion electrode or GDE). The GDLs are a porous mat of randomly aligned carbon fibers, typically with an impregnation of a polymer, such as polytetrafluoroethylene (PTFE) to control water wetting.

In order to increase PEM conductance and overall PEFC power output, there has been a drive to reduce PEM thickness, as described in U.S. RE37,307. Reducing PEM thickness, however, can result in reduced structural integrity and handling problems during the manufacturing process. Processes have been developed to address such issues.

Japanese Publication No. H06-203851, for example, discloses a method for laminating and bonding a solid polyelectrolyte film to an electrode sheet (typically a catalyst layer formed on a gas diffusion layer). A bonding method is disclosed in which a metallic mesh and a polytetrafluoroethylene sheet are additionally laminated and hot-pressed. It is disclosed that, with this method, the problems of damage of electrode sheets and softening of electrode sheets resulting in sticking to the press plate during hot-pressing on the laminate formed of the solid polyelectrolyte film and the electrode sheets can be overcome.

US Publication No. 2013/0157163 discloses a method that makes it possible to easily handle carbon black/porous PTFE composite sheets that are otherwise difficult to handle, without giving rise to wrinkle or breakage. The publication discloses a method for laminating the composite sheet on a membrane electrode assembly (MEA), comprising the steps of: providing the MEA; providing a composite sheet comprising functional powder and PTFE sheet; providing a release film; superimposing the composite sheet on the release film and pressing them at normal temperature; superimposing the composite sheet having the release film on MEA and hot-pressing them; and separating the release film from the composite sheet.

In addition to improving PEM handling during manufacture, the need exists for better processes for monitoring or inspecting PEM's to ensure that the PEM is of sufficient quality during the manufacturing process. More specifically, the need exists for better determining certain PEM characteristics or properties like thickness or detection of damages before and/or during MEA manufacture.

The foregoing references are incorporated herein by reference in their entireties and are intended to be illustrative and not exclusive. Other limitations of the related art will become apparent to those of skill in the art upon a reading of the specification and a study of the drawings.

SUMMARY OF THE INVENTION

Various embodiments of the present disclosure relate to a reflective laminate for use in manufacturing electrochemical devices (e.g., fuel cells).

The present disclosure is directed to laminates that are particularly useful in forming electrochemical devices, in particular, fuel cells. In one embodiment, the laminate comprises a polymer sheet and a reflective substrate adhered to the polymer sheet.

In one embodiment, a laminate of the present disclosure can be formed by removably attaching a polymer sheet to a reflective substrate.

By "removably adhered", it is meant that a laminate comprising a polymer sheet that is adhered to the reflective substrate and this polymer sheet can be removed from the reflective substrate without any damage or irreversible deformation occurring to the polymer sheet or the reflective substrate By "reflective," it is meant that the reflective substrate should have the ability to reflect electromagnetic radiation, preferably including visible light radiation, preferably in a specular manner, at an angle substantially normal to the surface of the laminate.

By "an angle normal to," it is meant at a 90° angle relative to the surface of the laminate. Since reflectivity may vary for the reflective substrate at different wavelengths, the reflectivity wavelength range may vary widely. As an example, in one embodiment, the reflective substrate has a reflectivity greater than 6%, greater than 10%, greater than 25%, greater than 50%, greater than 75% or greater than 85%. In some aspects, the reflective substrate has a reflectivity greater than 6% at wavelengths from 400 nm to 1000 nm.

By "at wavelengths from 400 nm to 1000 nm," it is meant that the reflective substrate has a reflectivity greater than the specified amount at all wavelengths between 400 nm and 1000 nm. The reflectivity of the reflective substrate can be determined at an angle normal to the surface of the laminate using a reflectometer equipped with a multi-wavelength light source and a spectrometer.

By "surface of the laminate", it is meant the surface of the laminate on which the electromagnetic radiation is applied to. In one embodiment, the electromagnetic radiation is applied to the top surface of the polymer sheet.

In some embodiments, the polymer sheet includes a perfluoro-electrolyte membrane. In other examples, the polymer sheet can include a perfluoro sulfonic acid resin reinforced with expanded porous polytetrafluoroethylene ("ePTFE"). In still another example, the polymer sheet can include a polymer electrolyte membrane (PEM).

The reflective substrate can include a metal substrate (e.g., aluminum). In some aspects, the reflective substrate includes a reflective layer and a carrier layer. In this aspect, the reflective layer may include a metal substrate (e.g., aluminum). The carrier layer may include polyethylene terephthalate ("PET"). In some aspects, the reflective substrate can also comprise a protective layer attached to the reflective layer. The protective layer may include, for example, a cyclic olefin copolymer.

In some embodiments, the laminate provides the ability to observe one or more characteristics or properties of the polymer sheet (e.g., size of the polymer sheet or presence of defects in the polymer sheet). For example, in one embodiment, the invention is to a method of determining a characteristic of a polymer sheet. The method includes removably attaching the reflective substrate to the polymer sheet to form the laminate. The method further includes transmitting electromagnetic radiation through the polymer sheet and to the underlying reflective substrate to reflect at least a portion of the electromagnetic radiation. The method can further include detecting the reflected portion of the electromagnetic radiation, e.g., with a spectrometer, and determining a characteristic or property of the polymer sheet based on the reflected portion of the electromagnetic radiation. Attaching the reflective substrate to the polymer sheet surprisingly can allow the property of the polymer sheet to be more easily determined than through conventional means. In other examples, the reflective substrate can also inhibit or prevent defect formation (e.g., pinhole formation) in the polymer sheet.

In some aspects, the method also includes applying a catalyst electrode (e.g., an anode or a cathode) to opposite sides of the polymer sheet to form a membrane electrode assembly ("MEA"). For example, a catalyst electrode can be applied (e.g., hot pressed, laminated, or otherwise disposed) on a side or surface of the polymer sheet. Another catalyst electrode can be applied to an opposite side or surface of the polymer sheet. In some aspects, the reflective substrate is removed (e.g., decoupled) from the polymer sheet prior to applying a catalyst electrode to the polymer sheet. In other examples, a catalyst electrode can be applied to the polymer sheet before removing the reflective substrate. The method may also comprise sandwiching the MEA between gas diffusion layers (GDL's) to form a fuel cell.

In another embodiment, the invention is to a process for manufacturing a reflective laminate. The process includes applying a specific amount of a polymer solution onto a moving reflective substrate. The process can further include laminating (e.g. contacting) the polymer solution with an ePTFE layer that is moving in the same direction and at the same speed as the reflective substrate. The polymer solution is impregnating the ePTFE layer. The process also optionally includes drying the polymer solution that is laminated with the ePTFE layer at a temperature, optionally between 80° C. and 250° C., which can cause a coated structure to form. The coated structure thus may include a reflective substrate attached to a polymer layer that is impregnated with ePTFE. The process optionally further includes winding up or rolling the coated structure. In some aspects, another amount of the polymer solution is applied to the coated structure and the other amount of the polymer solution can be laminated with an ePTFE layer and dried to form another coated structure. In some embodiments, the process can be repeated to form a solid multilayer polymer sheet that includes at least one coated structure. In some embodiments, the solid multilayer polymer sheet has an average thickness between 1 μm to 100 μm.

DETAILED DESCRIPTION OF THE INVENTION

Figure 1:
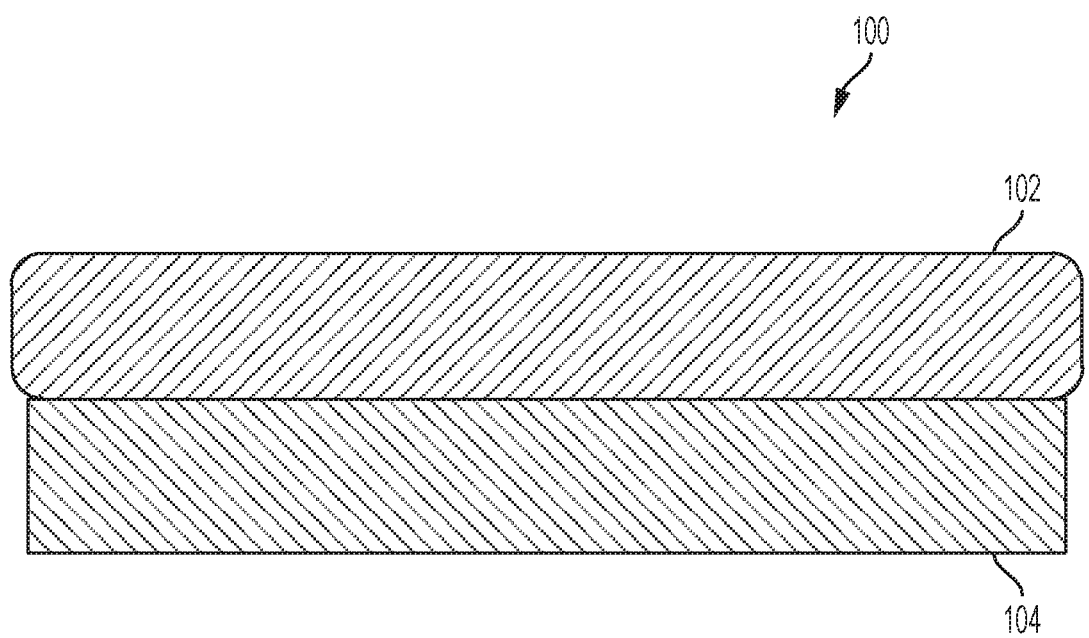
FIG. 1 is a schematic view of a reflective laminate that includes a polymer sheet and a reflective substrate, according to one embodiment of the invention.

The present disclosure is directed to reflective laminates that are particularly useful in forming electrochemical devices, in particular, fuel cells. In one embodiment, the reflective laminate comprises a polymer sheet and a reflective substrate adhered to the polymer sheet. In some embodiments, the reflective substrate is removably adhered to the polymer sheet. The reflective substrate can have a wide range of reflectivity characteristics (e.g., ability to reflect electromagnetic radiation, preferably including visible light). As an example, the reflective substrate can have a reflectivity greater than 6% at wavelengths from 400 nm to 1000 nm. Unless otherwise indicated herein, the reflectivity of the reflective substrate is determined at an angle normal to the surface of the laminate using a reflectometer equipped with a multi-wavelength light source and a spectrometer. By "an angle normal to," it is meant at a 90° angle relative to the surface of the laminate.

The polymer sheet can include a porous reinforcement layer. In some embodiments, the polymer sheet comprises a polymer electrolyte membrane (PEM). For example, the polymer sheet may include a perfluoro-electrolyte membrane. In another example, the polymer sheet can include a perfluorosulfonic acid resin reinforced with expanded porous polytetrafluoroethylene.

The reflective substrate optionally includes a metal substrate (e.g., an aluminum substrate). The specific metal chosen may vary widely so long as it is reflective. A non-limiting list of exemplary metals includes: aluminum, beryllium, cerium, chromium, copper, germanium, gold, hafnium, manganese, molybdenum, nickel, platinum, rhodium, silver, tantalum, titanium, tungsten, zinc, or alloys such as Inconel or bronze. The reflective substrate optionally comprises a mixture or alloy of two or more metals, optionally two or more of the metals listed above. The reflective substrate optionally can include a high reflectivity polymeric multilayer film such as Vikuiti™ Enhanced Specular Reflector available from 3M company. In yet another example, the reflective substrate optionally can include a high reflectivity non-metal inorganic dielectric multilayer film comprised of materials such as, for example, magnesium fluoride, calcium fluoride, titanium dioxide, silicon dioxide. In some aspects, the reflective substrate includes a reflective layer and a carrier layer. The reflective layer can include a metal substrate (e.g. aluminum) or a high reflectivity non-metal multilayer film. The carrier layer can include polyethylene ("PE"), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC"). In some aspects, the reflective substrate also includes a protective layer, which can include polyethylene (PE), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC"). The reflective substrate can cover the polymer sheet and reflect or absorb at least a portion of electromagnetic radiation transmitted toward or traversing the reflective laminate. The portion of electromagnetic radiation reflected or absorbed by the polymer sheet and reflective substrate can be used to analyze the polymer sheet for one or more characteristics, e.g., identify any undesired defects in the polymer sheet. The characteristic of the polymer sheet could thus include, for example, defects in the polymer sheet or the size or thickness of the polymer sheet.

In one embodiment, a polymer sheet can be attached to a reflective substrate to form the reflective laminate. The reflective laminate can be positioned in a path of electromagnetic radiation, and the electromagnetic radiation can be transmitted through the polymer sheet. The reflective substrate can then reflect at least a portion of the electromagnetic radiation. Various methods and techniques (e.g., reflective defect inspection techniques) can be used to determine the presence of a defect in the polymer sheet based on the portion of the electromagnetic radiation reflected or absorbed by the reflective substrate.

In another example, the size or thickness of the polymer sheet can be determined based on the interference of portions of the electromagnetic radiation reflected by a top surface of the polymer sheet and the portion of the electromagnetic radiation reflected at the interface of polymer sheet and the reflective substrate. Various methods and techniques, such as, for example, interferometric spectral reflectometry, can be used to determine the size or thickness of the polymer sheet based on the interference pattern of light reflected from the top surface of the polymer sheet and the interface between polymer sheet and the reflective substrate.

The reflective substrate also provides structural support to the polymer sheet, thereby providing the ability to handle and/or transport the reflective laminate without damaging the polymer sheet. In addition, in some aspects, the reflective substrate can inhibit or prevent a defect (e.g., a pinhole) from forming in the polymer sheet. For example, during packaging operations, the reflective laminate can be rolled into rolled product, which may cause the polymer sheet to accumulate static charge. Subsequently, the roll of reflective laminate may be unrolled, which can similarly cause static discharge. Static discharge is generally undesired in that it may cause a defect (e.g., a pinhole) in the polymer sheet. In some aspects, the reflective substrate dissipates static charge that accumulates in the polymer sheet during packaging operations and inhibits or prevents formation of defects when the reflective laminate is unrolled.

In some embodiments, a catalyst electrode (e.g., an anode or a cathode) can be applied (e.g., hot pressed, laminated, or otherwise disposed) to a surface of the polymer sheet. An opposing catalyst electrode may be formed on the opposite surface of the polymer sheet through similar means, preferably after removal of the reflective substrate. In this manner, a membrane electrode assembly ("MEA") may be formed. Thus, in some embodiments, a catalyst electrode is applied to a surface of the polymer sheet before or after removing the reflective substrate from the polymer sheet.

In another embodiment, the invention is to a process for manufacturing a reflective laminate comprising applying a specific amount of a polymer solution onto a moving reflective substrate. The process can further include laminating (e.g. contacting) the polymer solution with ePTFE layer that is moving in the same direction and at the same speed as the reflective substrate. The process can further include impregnating the ePTFE layer with the polymer solution. The process also optionally includes drying the polymer solution that is laminated with the ePTFE layer at a temperature, optionally between 80° C. and 250° C., to form a coated structure. The coated structure can include the reflective substrate attached to a polymer layer that is reinforced with an ePTFE layer. The process can further include winding or rolling up the coated structure. In some aspects, another amount of the polymer solution is applied to the coated structure and the other amount of the polymer solution can be laminated with an ePTFE layer and dried to form another coated structure. For example, the other amount of polymer solution can be applied and dried on top of the first coated structure to form a polymer-impregnated ePTFE-polymer. In some embodiments, the process can be repeated to form a solid multilayer polymer sheet that includes at least one coated structure. The solid multilayer polymer sheet can have an average thickness between 1 µm to 100 µm.

These illustrative examples are given to introduce the general subject matter discussed herein and are not intended to limit the scope of the disclosed concepts. These examples should not be interpreted as implying any particular order or arrangement among or between steps or elements except when the order of individual steps or arrangement of elements is explicitly described. The following sections describe various additional features and examples with reference to the drawings in which like numerals indicate like elements, and directional descriptions are used to describe the illustrative examples but, like the illustrative examples, should not be used to limit the present disclosure.

FIG. 1 is a schematic view of a reflective laminate 100 that includes a polymer sheet 102 and a reflective substrate 104. The polymer sheet 102 can include a polymer or fluoropolymer. As an example, the polymer sheet 102 can include a porous or microporous polymer reinforcement layer. In some embodiments, the polymer sheet 102 comprises a PEM. In other examples, the polymer sheet 102 includes a perfluoro-electrolyte membrane. In still another example, the polymer sheet 102 includes a perfluoro sulfonic acid resin reinforced with expanded porous polytetrafluoroethylene. In other examples, the polymer sheet 102 can include any other material, including, but not limited to, a material selected from a group consisting of perfluorinated sulfonic acid resin, perfluorinated carboxylic acid resin, polyvinyl alcohol, divinyl benzene, styrene based polymers, and metal salts with or without a polymer. Examples of materials suitable for use as the polymer sheet or a component of the polymer sheet 102 include, but are not limited to, Nafion™ manufactured by E.I. du Pont de Nemours and Company, USA; GORE-SELECT® membranes, manufactured by W.L.Gore & Associates, Co., Ltd., Japan, etc. The polymer sheet 102 can be made by various methods or techniques. Exemplary methods of manufacturing polymer sheet 102 are described in U.S. Pat. Nos. 6,254,978, 8,652,705, 6,613,203, 5,547,551 (RE37,307), U.S. Pat. No. 5,635,041 (RE37,656), and U.S. Pat. No. 5,599,614 (RE37,701), each of which is incorporated herein by reference in its entirety.

The size, shape and weight of the polymer sheet 102 is not particularly limited. For example, the polymer sheet 102 can have an average thickness between 1 µm to 100 µm, e.g., from 14 µm to 80 µm, e.g., from 15 µm to 60 µm. As an example, the polymer sheet 102 can have a thickness of 1 µm or more, 14 µm or more, 15 µm or more or 25 µm or more. In still another example, the polymer sheet 102 can have a thickness that is not more than 60 µm.

In some embodiments, the polymer sheet 102 has an equivalent weight ("EW") of below 2000 gr/mole equivalence. In other embodiments, the polymer sheet 102 has an EW of below 950 gr/mole equivalence, preferably below 800 gr/mole equivalence, most preferably below 700 gr/mole equivalence. The EW, as used herein, is defined as a weight of a polymer sheet necessary to neutralize one mole equivalent of sodium hydroxide.

In some aspects, the reflective substrate 104 is used to reflect electromagnetic radiation. For example, the reflective substrate 104 can have a reflectivity greater than 6%, greater than 10%, greater than 25%, greater than 50%, greater than 75% or greater than 85%. As an example, the reflective substrate 104 can have a reflectivity greater than 6%, greater than 10%, greater than 25%, greater than 50%, greater than 75% or greater than 85% at wavelengths from 400 nm to 1000 nm. In other aspects, the reflective substrate 104 may have a reflectivity greater than 6%, greater than 10%, greater than 25%, greater than 50%, greater than 75% or greater than 85%, at a wavelength of 600 nm. As another aspect, the reflective substrate 104 has a reflectivity greater than 6%, greater than 10%, greater than 25%, greater than 50%, greater than 75% or greater than 85%, at 700 nm. In still another aspect, the reflective substrate 104 has a reflectivity greater than 6%, greater than 10%, greater than 25%, greater than 50%, greater than 75% or greater than 85%, at wavelengths from 900 nm to 1000 nm.

In terms of ranges, the reflective substrate 104 may have a reflectivity between 10% and 99% at wavelengths from 400 nm to 1000 nm. As an example, the reflective substrate 104 can have a reflectivity between 10% and 99% at a wavelength of 800 nm, or at a wavelength of 900 nm. In still other aspects, the reflective substrate 104 may have a reflectivity between 85% and 95% at wavelengths from 400 nm to 1000 nm. As an example, the reflective substrate 104 can have a reflectivity between 85% and 95% at a wavelength of 500 nm, 600 nm, 700 nm, 800 nm or 900 nm.

Unless otherwise specified herein, reflectivity of the reflective substrate 104 is determined at an angle normal to the surface of the laminate using a reflectometer equipped with a multi-wavelength light source light source and a spectrometer. The multi-wavelength light source light source can be any white-light source for providing light of various or multiple wavelengths. As an example, the multi-wavelength light source can be a light bulb.

Figure 2:
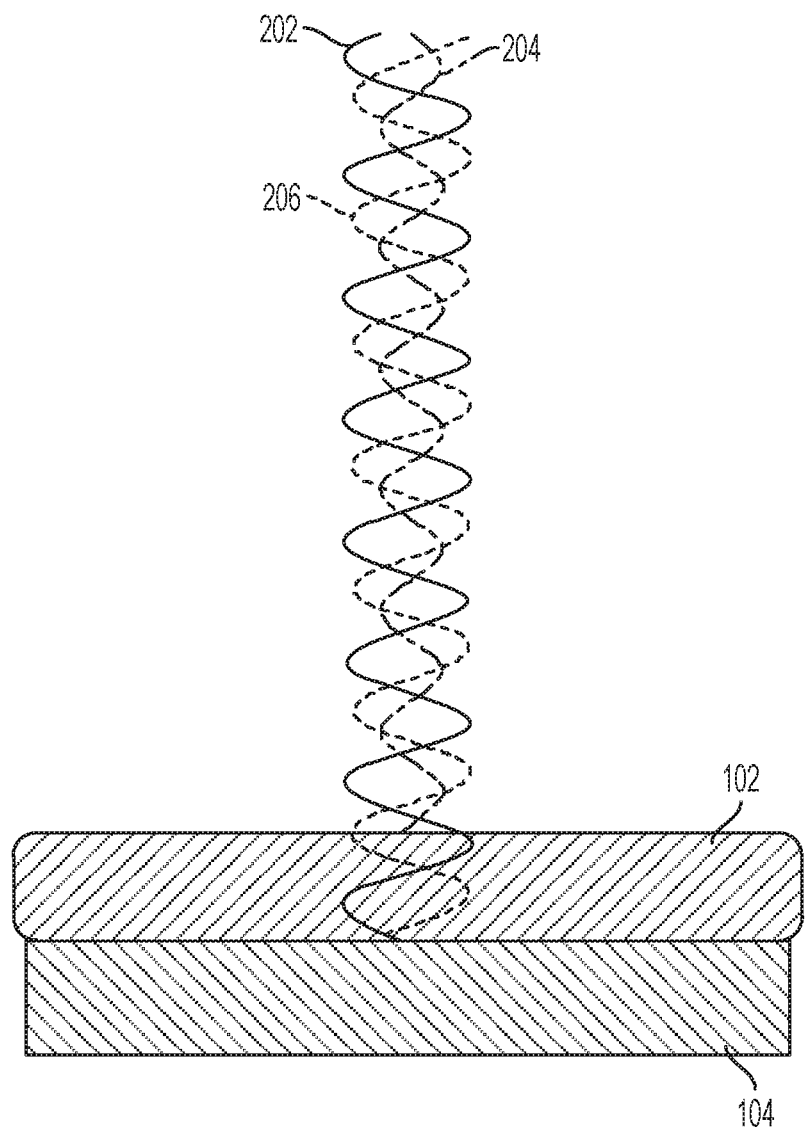
FIG. 2 is cross-sectional schematic view of a reflective laminate and incident electromagnetic beam at least a portion of which reflects from the top surface of a polymer sheet, another portion of which traverses said polymer sheet and is subsequently being reflected at the interface with a reflective substrate, according to one embodiment of the invention.

The reflective substrate 104 can be removably coupled or removably adhered to the polymer sheet 102 to form the reflective laminate 100. In some aspects, a reflective layer of the reflective substrate 104 can be attached to the polymer sheet 102 to couple or adhere the reflective substrate 104 to the polymer sheet 102. In another example, a carrier layer of the reflective substrate 104 can be attached to the polymer sheet 102 to couple or adhere the reflective substrate 104 to the polymer sheet 102. The reflective substrate 104 can cover the polymer sheet 102 and reflect or absorb at least a portion of electromagnetic radiation transmitted toward or traversing the polymer sheet 102. For example, FIG. 2 is cross-sectional schematic view of a reflective laminate 100 and incident electromagnetic beam 202, at least a portion 204 of said beam 202 reflects from the top surface of a polymer sheet 102, another portion 206 of said beam 202 traverses said polymer sheet 102 and is subsequently being reflected at the interface with the reflective substrate 104.

In some aspects, the incident electromagnetic beam 202 is provided from any electromagnetic source or device for providing electromagnetic radiation. As shown, at least a portion of the incident electromagnetic beam 202 (e.g., the portion 204) reflects from the top surface of the polymer sheet 102. Another portion of the incident electromagnetic beam 202 (e.g., the portion 206) traverses the polymer sheet 102 and is subsequently reflected at the interface with the reflective substrate 104). Features in the polymer sheet 102, e.g., defects, may absorb a portion of the electromagnetic beam 202. In the example depicted in FIG. 2, one electromagnetic beam 202, is depicted as being incident, partially reflecting at the top surface of the polymer sheet 102, traversing the polymer sheet 102 and being partially reflected at the interface with the reflective substrate 104, although any number of different beams may be employed.

In some embodiments, a characteristic or property of the polymer sheet 102 is determined based on the interference of the portion of an electromagnetic beam reflected by the top surface of the polymer sheet and at the interface with the reflective substrate 104 (e.g., the portions 204, 206 of electromagnetic beam 202). Examples of a characteristic or property include, but are not limited to, the size or thickness of the polymer sheet 102, a presence of a defect (e.g., a foreign particle, bubble, scratch, inhomogeneity, pin hole, etc.) in the polymer sheet 102.

Figure 3:
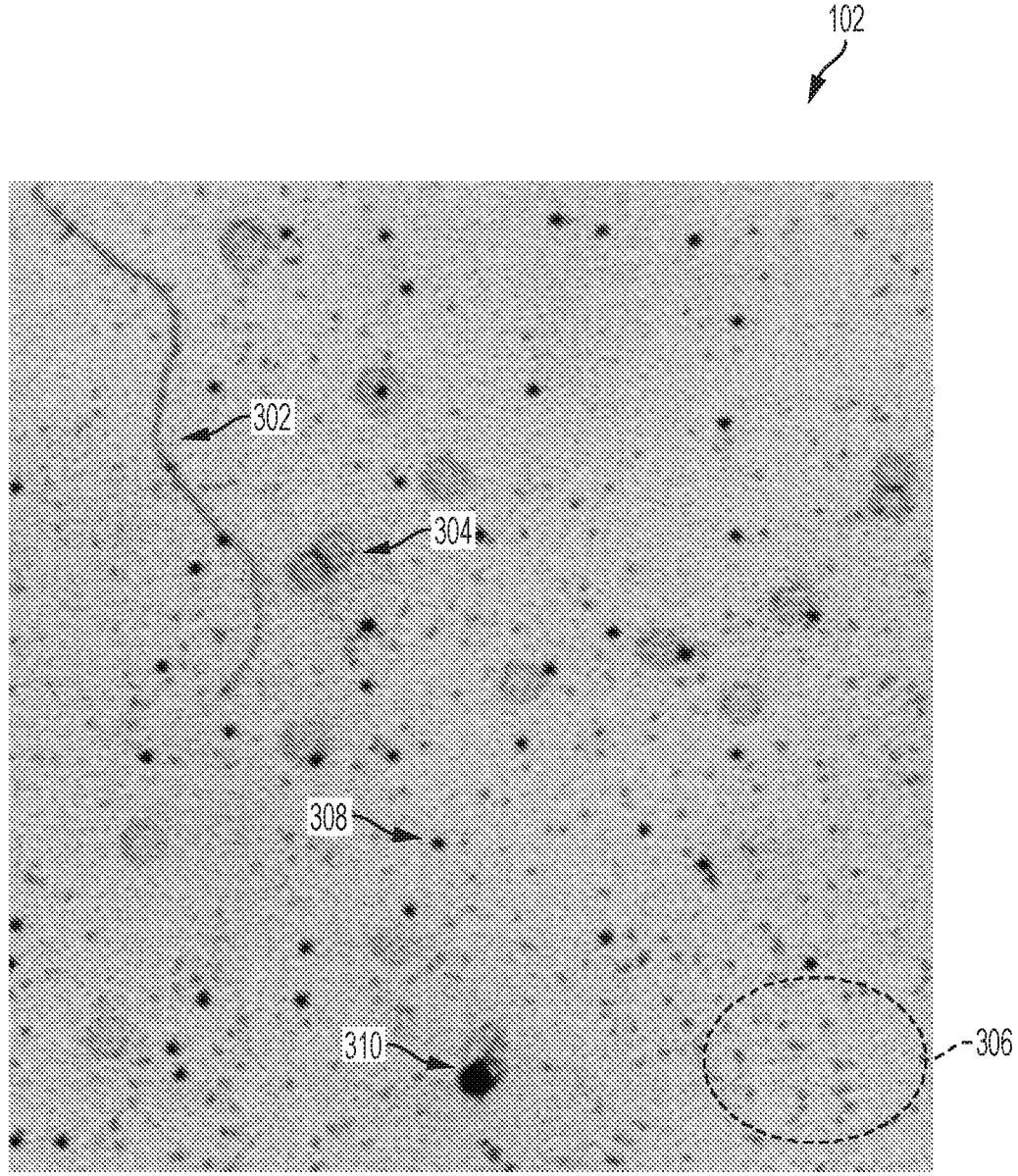
FIG. 3 is a top view of an image showing an example of defects in a polymer sheet, according to one embodiment of the invention.

FIG. 3 provides a top view of an image showing an example of defects 302, 304, 306, 308, 310 in the polymer sheet 102. In some aspects, a reflective substrate (e.g., the reflective substrate 104 of FIG. 1) provides the ability to easily observe one or more defects 302, 304, 306, 308, 310 in the polymer sheet 102. The defects 302, 304, 306, 308, 310 in the polymer sheet 102 can each be any defect in the polymer sheet 102 and can each have any size or shape. As an example, defect 302 can be a fiber in the polymer sheet 102. As another example, defect 304 can be a bubble in the polymer sheet 102. In some embodiments each defect 302, 304, 306, 308, 310 can be of virtually any shape or size. As an example, defect 306 can include various particles, bubbles, scratches, inhomogeneities, or pinholes each having a size of about 15 µm. Defect 308 can have a size of about 200 µm. Defect 310 can have a size of about 50 µm. The defects detected optionally range in size (e.g., diameter or largest dimension irregularly shaped defects) or have an average size, from 1 to 500 µm, e.g., from 1 to 100 µm or from 1 to 50 µm. It has surprisingly and unexpectedly been discovered that defects may be more easily observed when reflecting radiation of a reflective substrate according to this aspect of the invention rather than passing radiation through the polymer sheet and through a transparent (non-reflective) substrates.

In some aspects, various methods and techniques (e.g., reflective defect inspection techniques or spectral interferometry and spectral reflectometry techniques) can be used to determine a characteristic or property of the polymer sheet 102 based on a portion of an electromagnetic beam reflected (e.g., the portions 204, 206 of electromagnetic beam 202) by a reflective substrate removably attached to the polymer sheet 102 (e.g., the reflective substrate 104).

Returning to FIGS. 1-2, in some aspects, the reflective substrate 104 inhibits or prevents a defect (e.g., defects 302, 304, 306, 308, 310 of FIG. 3) from forming in the polymer sheet 102. For example, the reflective laminate 100 can be rolled into a rolled product, which may cause the polymer sheet 102 to accumulate static charge. Subsequently, the roll of reflective laminate 100 may be unrolled, which can similarly cause static discharge. The static discharge may cause the defect to form in the polymer sheet 102. In some examples, the reflective substrate 104 dissipates static charge that may accumulate in the polymer sheet 102 when the reflective laminate 100 is rolled and prevent the defect from forming when the reflective laminate 100 is unrolled.

Figure 4:
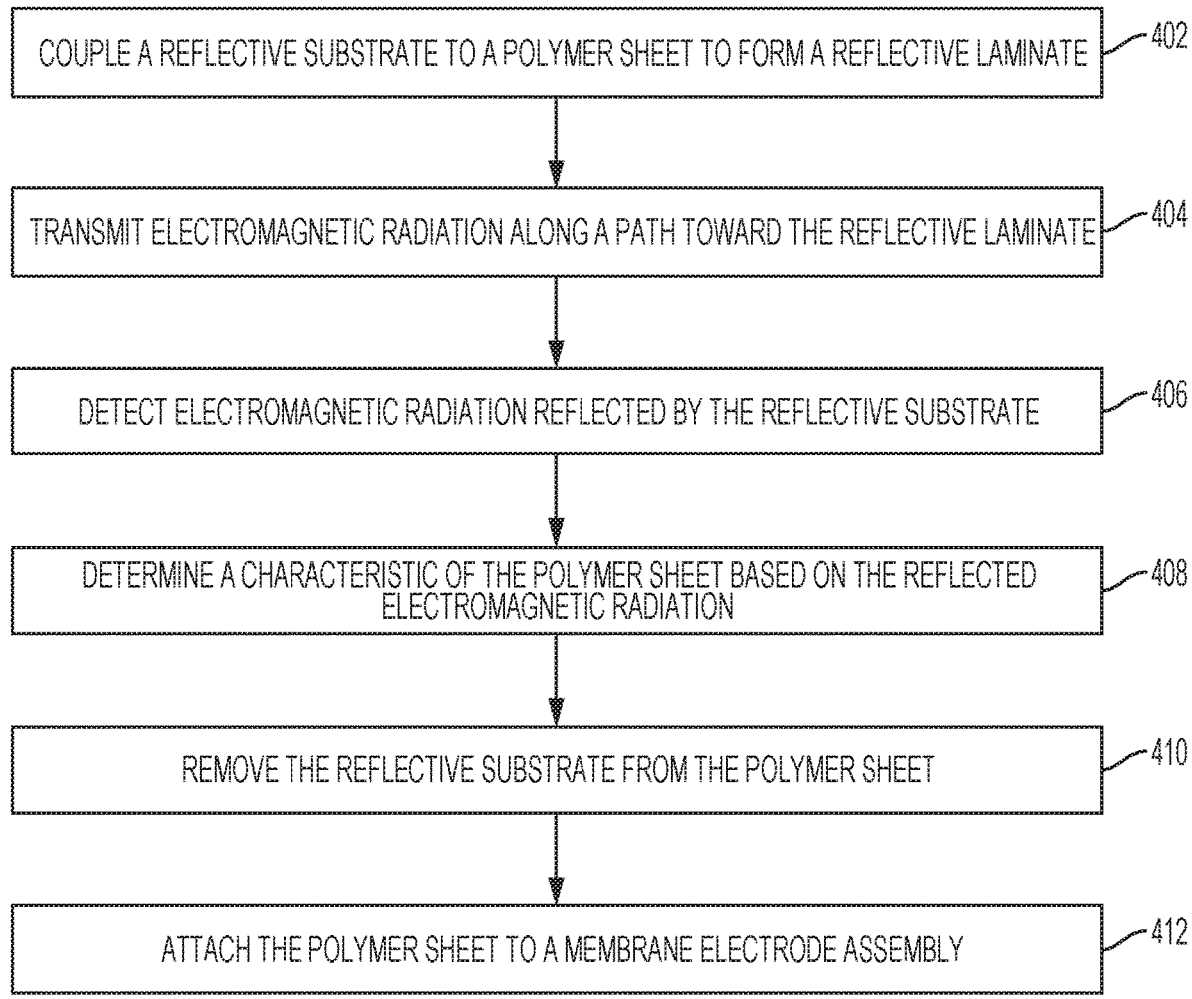
FIG. 4 is a flow chart depicting an example of a process for determining a characteristic of a polymer sheet coupled to a reflective substrate, according to one embodiment of the invention.

FIG. 4 is a flow chart depicting an example of a process for determining a characteristic of a polymer sheet coupled to a reflective substrate.

In block 402 a reflective substrate is coupled (removably adhered) to a polymer sheet to form a reflective laminate. In some aspects, the reflective substrate is configured in substantially the same manner as the reflective substrate 104 of FIGS. 1-2 and the polymer sheet is configured in substantially the same manner as the polymer sheet 102 of FIGS. 1-2.

In block 404, electromagnetic radiation is transmitted along a path toward the reflective laminate (e.g., the reflective laminate formed in block 402). The electromagnetic radiation can include an electromagnetic beam or multiple electromagnetic beams. The electromagnetic radiation is preferably transmitted toward the reflective laminate and traverses the polymer sheet. The transmission source preferably transmits the electromagnetic radiation at an angle normal to the surface of the laminate.

In block 406, reflected electromagnetic radiation is detected. As discussed, the reflective substrate of the reflective laminate can reflect and possibly absorb at least a portion of electromagnetic radiation or an electromagnetic beam transmitted toward or traversing the polymer sheet of the reflective laminate.

The sensor or detector used to detect the reflected electromagnetic radiation may vary widely, but preferably comprises any sensor or device for detecting electromagnetic radiation or an electromagnetic beam. In some embodiments, the sensor is positioned near the reflective laminate for detecting electromagnetic radiation reflected by the reflective substrate. The detector preferably comprises a spectrometer, which preferably is oriented at an angle normal to the surface of the laminate.

In block 408, a characteristic of the polymer sheet is determined based on the reflected electromagnetic radiation. In some examples, the characteristic of the polymer sheet can include a size or thickness of the polymer sheet. In another example, the characteristic of the polymer sheet can include a defect (e.g., a foreign particle, bubble, scratch, inhomogeneity, pin hole, etc.) in the polymer sheet. Various methods and techniques can be used to determine the characteristic of the polymer sheet based on the reflected electromagnetic radiation. For example, reflective defect inspection techniques can be used to determine a presence of a defect in the polymer sheet based on a portion of the electromagnetic radiation absorbed by the polymer sheet (e.g., by one or more defects in the polymer sheet). In some aspects, the presence of a defect in the polymer sheet is determined by visual inspection of the polymer sheet. In another example, interferometric spectral reflectometry techniques can be used to determine a size or thickness of the polymer sheet based on the portion of electromagnetic radiation reflected by the reflective substrate.

In some embodiments, the process for determining a characteristic of a polymer sheet coupled to a reflective substrate further includes, as shown in block 410, removing the reflective substrate from the polymer sheet. In some embodiments, the reflective laminate is secured prior to removing the reflective substrate from the polymer sheet. In this aspect, the securing can include securing the reflective laminate or a component thereof, e.g., the reflective substrate or the polymer sheet thereof.

In some embodiments, the process for determining a characteristic of a polymer sheet coupled to a reflective substrate further includes, as shown in block 412, forming a MEA. In some embodiments, a catalyst electrode (e.g., an anode or a cathode) can be applied to opposite sides or faces of the polymer sheet. For example, a first catalyst electrode can be applied (e.g., hot pressed, laminated, or otherwise disposed) on a first side or surface of the polymer sheet. A second catalyst electrode can then be applied to a second side or surface of the polymer sheet that is opposite to the first side. In some embodiments, the reflective substrate is removed (e.g., decoupled) from the polymer sheet prior to or after applying the first catalyst electrode. The reflective substrate is preferably removed prior to applying the second catalyst electrode to the polymer sheet.

The description above with regard to FIG. 4 should not be interpreted as implying any particular order or arrangement among or between steps except when the order of individual steps or arrangement of elements is explicitly described. The steps described in FIG. 4 may be performed in any logical order or arrangement.

Figure 5:
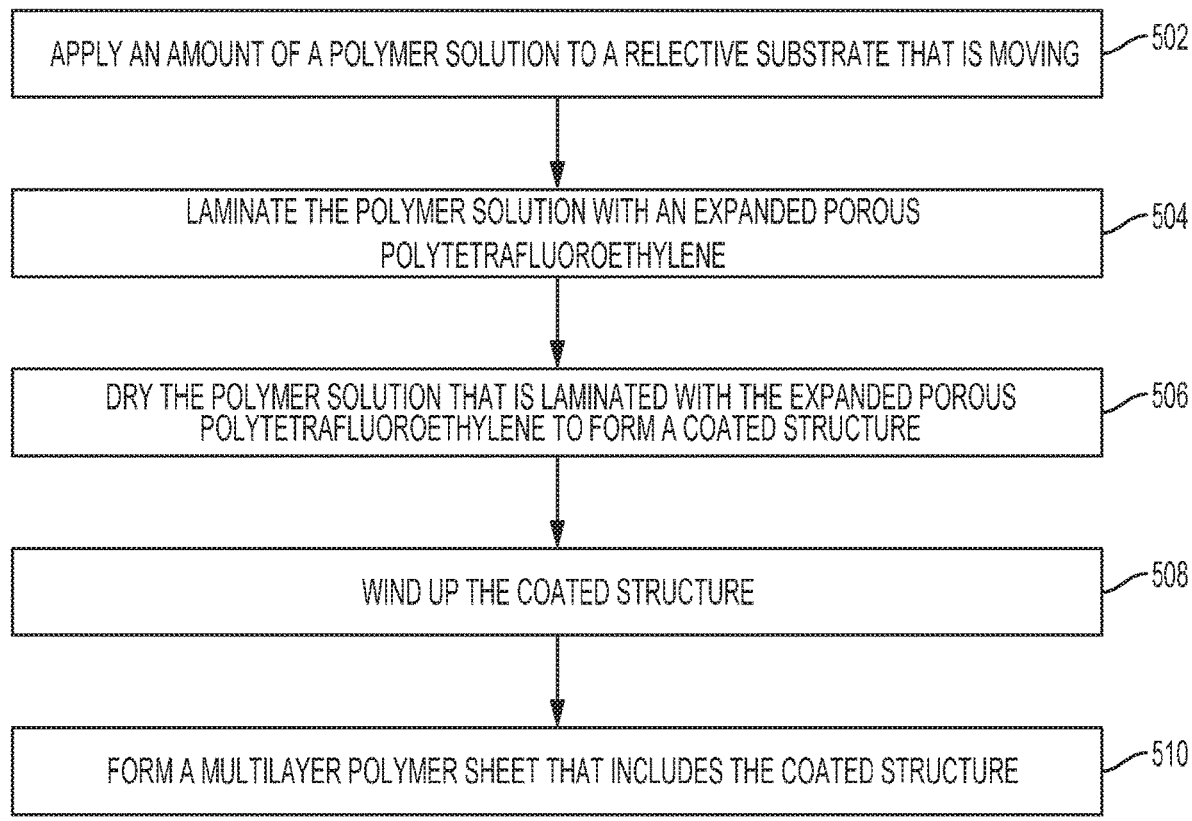
FIG. 5 is a flow chart depicting an example of a process for manufacturing a reflective laminate, according to one embodiment of the invention.

In another example, a reflective laminate can be manufactured according to a continuous process. FIG. 5 is a flow chart depicting an exemplary process for manufacturing a reflective laminate.

In block 502, an amount of a polymer solution is applied to a reflective substrate that is moving. In other examples, the polymer solution can be applied to a stationary reflective substrate. The reflective substrate can be configured in substantially the same manner as the reflective substrate 104 of FIGS. 1-2. The polymer solution can be applied in any manner, including without limitation, through manual application (e.g., manual labor) or through automated application (e.g., by an apparatus, device, machine, or the like). The amount of the polymer solution applied to the reflective substrate can be a specific or pre-metered amount.

In block 504, the polymer solution is laminated with an expanded porous polytetrafluoroethylene ("ePTFE") layer. In some aspects, the polymer solution can be laminated with an ePTFE layer that is deposited in a same direction and at a same speed as the reflective substrate. The polymer solution can be laminated with the ePTFE layer in any manner. In some embodiments, laminating the polymer solution with the ePTFE layer includes contacting the polymer solution with the ePTFE layer.

In block 506, the polymer solution that is laminated with the ePTFE layer is dried to form a coated structure. The coated structure can include the reflective substrate attached to the polymer layer that is reinforced with the ePTFE layer. In some aspects, drying the polymer solution that is laminated with the ePTFE layer to form the coated structure can include drying the polymer solution, the ePTFE layer, along with the reflective substrate at a temperature between 80° C. and 250° C. In some aspects, drying the polymer solution, the ePTFE layer, along with the reflective substrate can cause a coated structure to form. The coated structure can include the reflective substrate coupled to the polymer layer reinforced with an ePTFE layer.

In block 508, the coated structure can be wound or rolled up. For example, the coated structure can be wound with or without an interleaf around a roll core. An interleaf may or may not be necessary for keeping the polymer sheet from sticking to the back of the reflective substrate during storage and unwinding, keeping the polymer sheet clean during unwinding. Examples of interleaf materials include, but are not limited to, polyethylene (PE), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC").

In block 510, a multilayer polymer sheet that includes the coated structure is formed. In some examples, the multilayer polymer sheet includes one or more coated structures. For example, forming the multilayer polymer sheet can include repeating any step of the process for manufacturing the reflective laminate. For example, forming the multilayer polymer sheet can include applying another amount of the polymer solution to the coated structure (e.g., the coated structure formed in block 506). Forming the multilayer polymer sheet can also include laminating the other amount of the polymer solution with ePTFE to form another coated structure. Forming the multilayer polymer sheet can also include drying the various coated structures at a temperature, for example, between 80° C. and 250° C., to form the multilayer polymer sheet. In some embodiments, the resulting multilayer polymer sheet can be of any shape, size, or weight. For example, the polymer sheet 102 can have an average thickness from 1 μm to 100 μm.

The present invention will be better understood in view of the following non-limiting examples.

Example 1 (Comparative) Polymer Laminate with Transparent Substrate

A laminate comprising a transparent substrate and a 12 μm thick (nominal) polymer sheet comprising of perfluorosulfonic acid resin (EW 700 gr/mole equivalent) reinforced with expanded porous polytetrafluoroethylene was prepared using conventional laboratory technique. First, a perfluorosulfonic acid resin solution (obtained from Asahi Glass Company, Japan) was coated onto a 50 μm transparent substrate comprising PET and a protective COC layer (obtained from DVC, Japan) using a drawdown bar and laminated with an ePTFE reinforcement layer with mass/area of 4.5 g/m$^2$ that was stretched over a metal frame. This laminate was subsequently dried in an oven at 160° C. producing a solid coated structure comprising the transparent substrate coupled to a polymer layer reinforced with expanded porous polytetrafluoroethylene.

Another amount of perfluorosulfonic acid resin solution was then applied to the coated structure using a drawdown bar and was dried again at 160° C. The resulting laminate, which comprised the transparent substrate coupled to a polymer layer reinforced with expanded porous polytetrafluoroethylene with another polymer layer on top, was largely transparent indicating a full impregnation of the ePTFE reinforcement layer. Such laminate is known as GORE-SELECT® membrane obtained from W.L.Gore & Associates. To determine the characteristics such as reflectance and thickness of this laminate, spectral reflectance measurements were performed at an angle normal to the laminate using a spectral reflectometer system of the company Filmetrics, Inc., USA (model F3 equipped with fiber-based illumination and collection optics stage SS3). A reflectance spectrum was obtained by averaging 25 measurements, with each measurement taking 4 millisecond of integration time for the detector on the F3 reflectance system.

Figure 6:
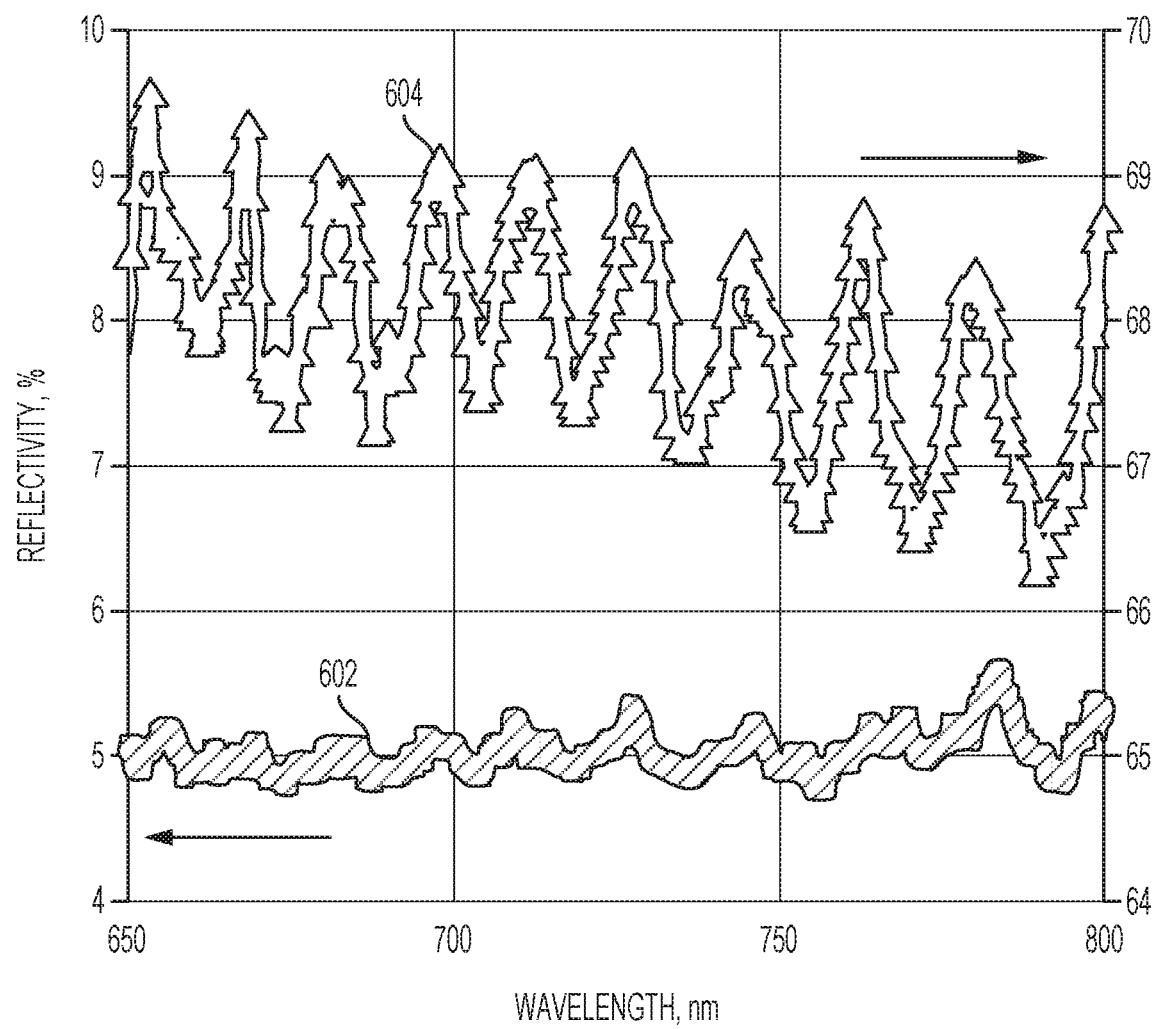
FIG. 6 is a graph showing reflectivity over various wavelengths for a conventional laminate (Example 1) and a reflective laminate (Example 2) according to one embodiment of the invention.
Figure 7:
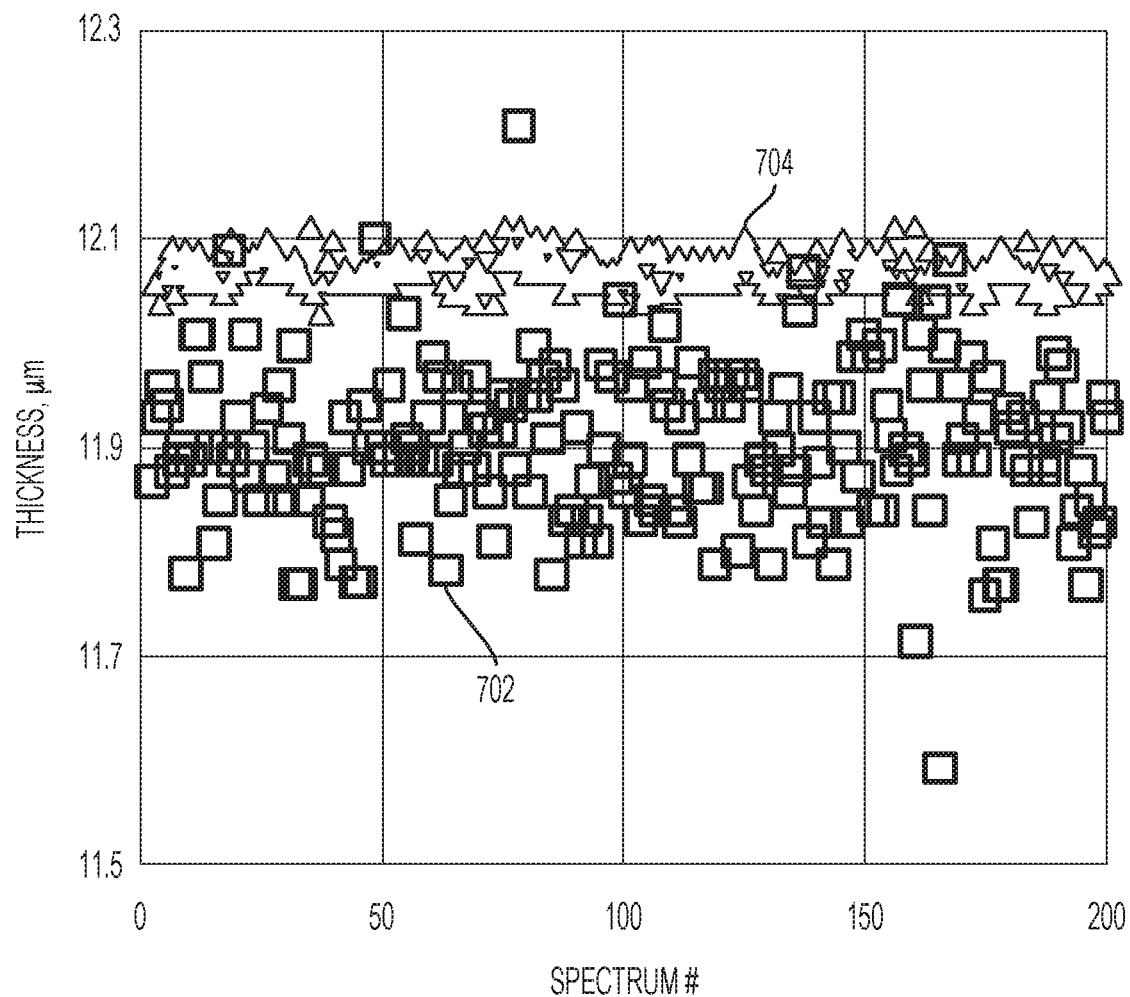
FIG. 7 is a graph showing thickness values extracted from measurements for a conventional laminate (Example 1) and a reflective laminate (Example 2).

Spectral reflectivity 602 obtained with the above-mentioned settings for the laminate comprising the transparent substrate and a 12 μm thick (nominal) polymer sheet in turn comprising of perfluorosulfonic acid resin (EW of 700 gr/mole equivalent) reinforced with expanded porous polytetrafluoroethylene is shown in FIG. 6 and was measured to be 5% in the wavelength region of 650 nm to 800 nm. Spectral reflectivity of this laminate is characterized by weakly pronounced interference fringes and overall a poor signal to noise ratio. Analysis of the reflectivity fringe pattern was performed and the thickness of the polymer sheet was calculated using the refractive index value of 1.32 for the polymer sheet. The spectral reflectivity measurements were repeated in the same manner on the same laminate in the same spot (laminate was not moved) at least 200 times. The thickness values 702 extracted from these 200 measurements for the transparent laminate are shown in FIG. 7. A substantial spread in thickness data can be observed in 702. Ideally, thickness data presented in graph 702 should have no spread since all spectra were collected from the exact same spot of the laminate without touching it. However, noise in thickness data is present and can be attributed to difficulty associated with reliable analysis of the weakly pronounced fringe pattern in the reflectivity spectra of transparent laminate 602. Mean thickness values for the polymer sheet in the transparent laminate described above was 11.890 μm with standard deviation of 0.084 μm polymer.

Example 2 Polymer Laminate on Reflective Substrate

A laminate comprising a reflective substrate and a 12 μm thick (nominal) polymer sheet comprising of perfluorosulfonic acid resin (EW 700 gr/mole equivalent) reinforced with expanded porous polytetrafluoroethylene was prepared using conventional laboratory technique. First, a perfluoro sulfonic acid resin solution (obtained from Asahi Glass Company, Japan) was coated onto a 25 μm reflective substrate comprising PET carrier and an aluminum metal reflective layer (obtainable from Dunmore Corporation, USA) using a drawdown bar and laminated with an ePTFE reinforcement layer with 4.5 mass/area of 4.5 g/m² that was stretched over a metal frame. This laminate was subsequently dried in an oven at 160° C. producing a solid coated structure comprising the reflective substrate removably adhered to a polymer layer reinforced with expanded porous polytetrafluoroethylene.

Another amount of perfluorosulfonic acid resin solution was then applied to the coated structure using a drawdown bar and was dried again at 160° C. The resulting laminate, which comprised the reflective substrate removably adhered to a polymer layer reinforced with expanded porous polytetrafluoroethylene with another polymer layer on top, was largely reflective indicating that polymer sheet was largely transparent indicating a full impregnation of the ePTFE reinforcement layer. To determine the characteristics such as reflectance and thickness of this laminate, spectral reflectance measurements were performed at an angle normal to the laminate using the spectral reflectometer system of Example 1. A reflectance spectrum was obtained by averaging 25 measurements, with each measurement taking 4 millisecond of integration time for the detector on F3 reflectance system.

Spectral reflectivity 604 obtained with the above mentioned settings for the laminate is shown in FIG. 6 and was measured to be about 68% in the wavelength region of 650 nm to 800 nm. Spectral reflectivity of this laminate was characterized by strong interference fringes and overall high signal to noise ratio. Analysis of the reflectivity fringe pattern was performed and the thickness of the polymer sheet was calculated using the refractive index value of 1.32 for the polymer sheet. The spectral reflectivity measurements were repeated in the same manner on the same laminate in the same spot (laminate was not moved) at least 200 times. The thickness values 704 extracted from these 200 measurements for the reflective laminate are shown in FIG. 7. A significantly smaller spread in thickness data can be observed in graph 704 in comparison to graph 702. Mean thickness values for the polymer sheet in the reflective laminate described above was 12.070 μm with standard deviation of 0.015 μm polymer. Thus the precision of reflectometry measurements for laminates comprising a polymer sheet on a reflective substrate was nearly 6 times better than for laminates comprising a polymer sheet on a transparent substrate. Use of reflective substrate has significantly improved ability to characterize polymer properties such as thickness. This translates into the ability to map polymer sheet thickness with greater precision in shorter time.

The foregoing description of certain examples, including illustrated examples, has been presented only for the purpose of illustration and description and is not intended to be exhaustive or to limit the disclosure to the precise forms disclosed. This description should not be interpreted as implying any particular order or arrangement among or between steps or elements except when the order of individual steps or arrangement of elements is explicitly described. In some examples, the steps described in the foregoing description may be performed in any order or arrangement. Numerous modifications, adaptations, and uses thereof will be apparent to those skilled in the art without departing from the scope of the disclosure.

What is claimed is:

1. A laminate having a surface, comprising:
   a polymer electrolyte membrane; and
   a reflective substrate removably adhered to the polymer electrolyte membrane,
      wherein removably adhered means the polymer electrolyte membrane can be removed from the reflective substrate without any damage or irreversible deformation occurring to the polymer electrolyte membrane and the reflective substrate;
      wherein the reflective substrate consists of a metal substrate, carrier layer, and optionally a protective layer, wherein the carrier layer directly contacts the polymer electrolyte membrane,
      wherein the carrier layer consists of polyethylene, polystyrene, cyclic olefin copolymer, cyclic olefin polymer, fluorinated ethylene propylene, perfluoroalkoxy alkanes, ethylene tetrafluoroethylene, polyvinylidene fluoride, polyetherimide, polysulfone, polyethersulfone, polyphenylene oxide, polyphenyl ether, polymethylpentene, polyethylene terephthalate, or polycarbonate; and
      said reflective substrate has a reflectivity greater than 6% at wavelengths from 400 nm to 1000 nm, as determined at an angle normal to the surface of the laminate using a reflectometer equipped with a multi-wavelength light source and a spectrometer.

2. The laminate of claim 1, wherein the reflective substrate has a reflectivity from 10% to 99% at wavelengths from 400 nm to 1000 nm, as determined at an angle normal to the surface of the laminate using the reflectometer equipped with the multi-wavelength light source and the spectrometer.

3. The laminate of claim 1, wherein the reflective substrate has a reflectivity from 85% to 95% at wavelengths from 400 nm to 1000 nm, as determined at an angle normal to the surface of the laminate using the reflectometer equipped with the multi-wavelength light source and the spectrometer.

4. The laminate of claim 1, wherein the reflective substrate has a reflectivity greater than 6% at wavelengths from 900 nm to 1000 nm, as determined at an angle normal to the surface of the laminate using the reflectometer equipped with the multi-wavelength light source and the spectrometer.

5. The laminate of claim 1, wherein the polymer electrolyte membrane comprises a perfluorosulfonic acid resin reinforced with expanded porous polytetrafluoroethylene.

6. The laminate of claim 1, wherein the polymer electrolyte membrane has an average thickness from 1 μm to 100 μm.

7. The laminate of claim 1, wherein the reflective substrate comprises aluminum.

8. The laminate of claim 1, wherein the carrier layer comprises polyethylene terephthalate.

9. The laminate of claim 1, wherein the protective layer comprises a cyclic olefin copolymer.

10. The laminate of claim 1, wherein the reflective substrate consists of the metal substrate, the carrier layer and the protective layer and the protective layer consists of polyethylene, polystyrene, cyclic olefin copolymer, cyclic olefin polymer, fluorinated ethylene propylene, perfluoroalkoxy alkanes, ethylene tetrafluoroethylene, polyvinylidene fluoride, polyetherimide, polysulfone, polyethersulfone, polyphenylene oxide, polyphenyl ether, polymethylpentene, polyethylene terephthalate, or polycarbonate.

11. The laminate of claim 1 wherein the carrier layer consists of polystyrene, cyclic olefin homopolymer, fluorinated ethylene propylene, perfluoroalkoxy alkanes, ethylene tetrafluoroethylene, polyvinylidene fluoride, polyetherim ide, polysulfone, polyethersulfone, polyphenylene oxide, polyphenyl ether, polyethylene terephthalate, or polycarbonate.

12. The laminate of claim 1 wherein the protective layer is attached to the metal substrate.

13. A laminate having a surface, comprising:
a polymer electrolyte membrane; and
a reflective substrate removably adhered to the polymer electrolyte membrane,
wherein removably adhered means the polymer electrolyte membrane can be removed from the reflective substrate without any damage or irreversible deformation occurring to the polymer electrolyte membrane and the reflective substrate;
wherein the reflective substrate consists of a metal substrate, a carrier layer, and a protective layer, wherein the carrier layer directly contacts the polymer electrolyte membrane;
wherein the protective layer consists of polyethylene, polystyrene, cyclic olefin copolymer, cyclic olefin polymer, fluorinated ethylene propylene, perfluoroalkoxy alkanes, ethylene tetrafluoroethylene, polyvinylidene fluoride, polyetherim ide, polysulfone, polyethersulfone, polyphenylene oxide, polyphenyl ether, polymethylpentene, polyethylene terephthalate, or polycarbonate;
wherein the carrier layer consists of polyethylene, polystyrene, cyclic olefin copolymer, cyclic olefin polymer, fluorinated ethylene propylene, perfluoroalkoxy alkanes, ethylene tetrafluoroethylene, polyvinylidene fluoride, polyetherimide, polysulfone, polyethersulfone, polyphenylene oxide, polyphenyl ether, polymethylpentene, polyethylene terephthalate, or polycarbonate; and
said reflective substrate has a reflectivity greater than 6% at wavelengths from 400 nm to 1000 nm, as determined at an angle norm al to the surf ace of the laminate using a reflectometer equipped with a multi-wavelength light source and a spectrometer.

14. The laminate of claim 13, wherein the protective layer is attached to the metal substrate.

15. The laminate of claim 1, wherein the polymer electrolyte membrane comprises a perfluorosulfonic acid resin reinforced with expanded porous polytetrafluoroethylene, and wherein the protective layer comprises a cyclic olefin copolymer.

* * * * *